(12) United States Patent
Marshall et al.

(10) Patent No.: US 12,395,536 B2
(45) Date of Patent: Aug. 19, 2025

(54) INTEGRATING WIRELESS COMMUNICATIONS IN A CAMERA TO EXTEND AN ENTERPRISE NETWORK

(71) Applicant: Tyco Fire & Security GmbH, Neuhausen am Rheinfall (CH)

(72) Inventors: George Marshall, Dromore (GB); Terence Neill, Lisburn (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/450,288

(22) Filed: Aug. 15, 2023

(65) Prior Publication Data
US 2025/0063075 A1    Feb. 20, 2025

(51) Int. Cl.
| | |
|---|---|
| *G06F 13/00* | (2006.01) |
| *H04L 65/60* | (2022.01) |
| *H04L 67/12* | (2022.01) |
| *H04L 67/561* | (2022.05) |
| *H04L 67/568* | (2022.05) |
| *H04W 48/16* | (2009.01) |
| *H04W 84/12* | (2009.01) |

(52) U.S. Cl.
CPC ............ *H04L 65/60* (2013.01); *H04L 67/12* (2013.01); *H04L 67/561* (2022.05); *H04L 67/568* (2022.05); *H04W 48/16* (2013.01); *H04W 84/12* (2013.01)

(58) Field of Classification Search
CPC ....... H04L 65/60; H04L 67/12; H04L 67/561; H04L 67/568; H04W 48/16; H04W 84/12
USPC .................................. 709/217–219, 220–222
See application file for complete search history.

(56) References Cited

U.S. PATENT DOCUMENTS

| | | |
|---|---|---|
| 9,144,097 B2 | 9/2015 | Kao et al. |
| 11,190,861 B2 * | 11/2021 | Bali ...................... H04L 5/0037 |
| 2017/0272491 A1 | 9/2017 | Ortiz et al. |
| 2019/0349848 A1 * | 11/2019 | Bali ..................... H04L 12/2803 |
| 2020/0059976 A1 * | 2/2020 | Bhatia ................... H04W 8/005 |
| 2021/0051487 A1 | 2/2021 | Wu et al. |

FOREIGN PATENT DOCUMENTS

| | | |
|---|---|---|
| CN | 103795906 A | 5/2014 |
| CN | 104243541 A | 12/2014 |
| CN | 106341648 A | 1/2017 |
| CN | 106657891 A | 5/2017 |

(Continued)

OTHER PUBLICATIONS

Combined Search and Examination Report issued in corresponding GB Application No. 2411977.8 dated Feb. 4, 2025.

*Primary Examiner* — Kenneth R Coulter
(74) *Attorney, Agent, or Firm* — ArentFox Schiff LLP

(57) ABSTRACT

Systems and methods are disclosed for providing a wireless communications gateway at a camera. The gateway camera can transmit wireless signals to advertise a wireless communication functionality of the camera, establish, with a device, a wireless connection for communicating with the device, receive, from the device, wireless communications including data for forwarding over an enterprise network, and forward, via a different connection, the data over the enterprise network. The other device can be a camera as well, or substantially any device that can wirelessly communicate with the gateway camera.

16 Claims, 4 Drawing Sheets

(56) References Cited

FOREIGN PATENT DOCUMENTS

| | | |
|---|---|---|
| CN | 209170540 U | 7/2019 |
| CN | 210143045 U | 3/2020 |
| CN | 211880476 U | 11/2020 |
| CN | 112887675 A | 6/2021 |
| CN | 216904937 U | 7/2022 |
| CN | 115190275 A | 10/2022 |
| CN | 218387717 U | 1/2023 |
| CN | 218830099 U | 4/2023 |
| KR | 101494884 B1 | 2/2015 |
| KR | 102477660 B1 | 12/2022 |

\* cited by examiner

INTEGRATING WIRELESS COMMUNICATIONS IN A CAMERA TO EXTEND AN ENTERPRISE NETWORK

BACKGROUND

The present disclosure relates to cameras deployed within an area, and more particularly to the cameras providing video data in an enterprise network.

Many areas, such as areas within a building, have cameras deployed for various purposes, such as providing video data to an enterprise network. This can allow security personnel to surveil the area using a computer or other device connected to the enterprise network to receive the video data. In other examples, the video data can be used by automated systems to identify people occupying the area, provide access to an area based on identifying people, detect activities or incidents occurring in the area, trigger security notifications based on the activities or incidents, etc. Each camera is connected to the enterprise network via a wired connection. This can require cables to be run throughout the area (and/or other areas, within walls, etc.) to connect each camera to the network. In addition, the cameras can require a port to facilitate attaching the camera to the wired connection to the enterprise network.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, a camera for providing video withing a building is provided including an input module for capturing video, a communications module for sending captured video over an enterprise network, and a transceiver for communicating with a device. The transceiver is configured for establishing a wireless connection with the device using a wireless communication technology, and receiving wireless communications from the device via the wireless connection. The communications module forwards the wireless communications from the device over the enterprise network.

In another aspect, a method for providing a wireless communications gateway at a camera is provided that includes transmitting, by the camera, wireless signals to advertise a wireless communication functionality of the camera, establishing, by the camera and with a device, a wireless connection for communicating with the device, receiving, by the camera and from the device, wireless communications including data for forwarding over an enterprise network, and forwarding, by the camera and via a different connection, the data over the enterprise network.

In another aspect, a camera for providing video withing a building is provided that includes an input module for capturing video, and a transceiver for communicating with a second camera, the transceiver configured for establishing a wireless connection with the second camera using a wireless communication technology, and transmitting wireless communications to the second camera via the wireless connection.

In another aspect, cameras, devices, or systems are provided that includes various hardware, software, or other components for providing a gateway camera or communicating with a gateway camera using one or more methods described herein. In another aspect, a computer-readable medium is provided herein that stores computer executable instructions for providing a gateway camera or communicating with a gateway camera using one or more methods described herein.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
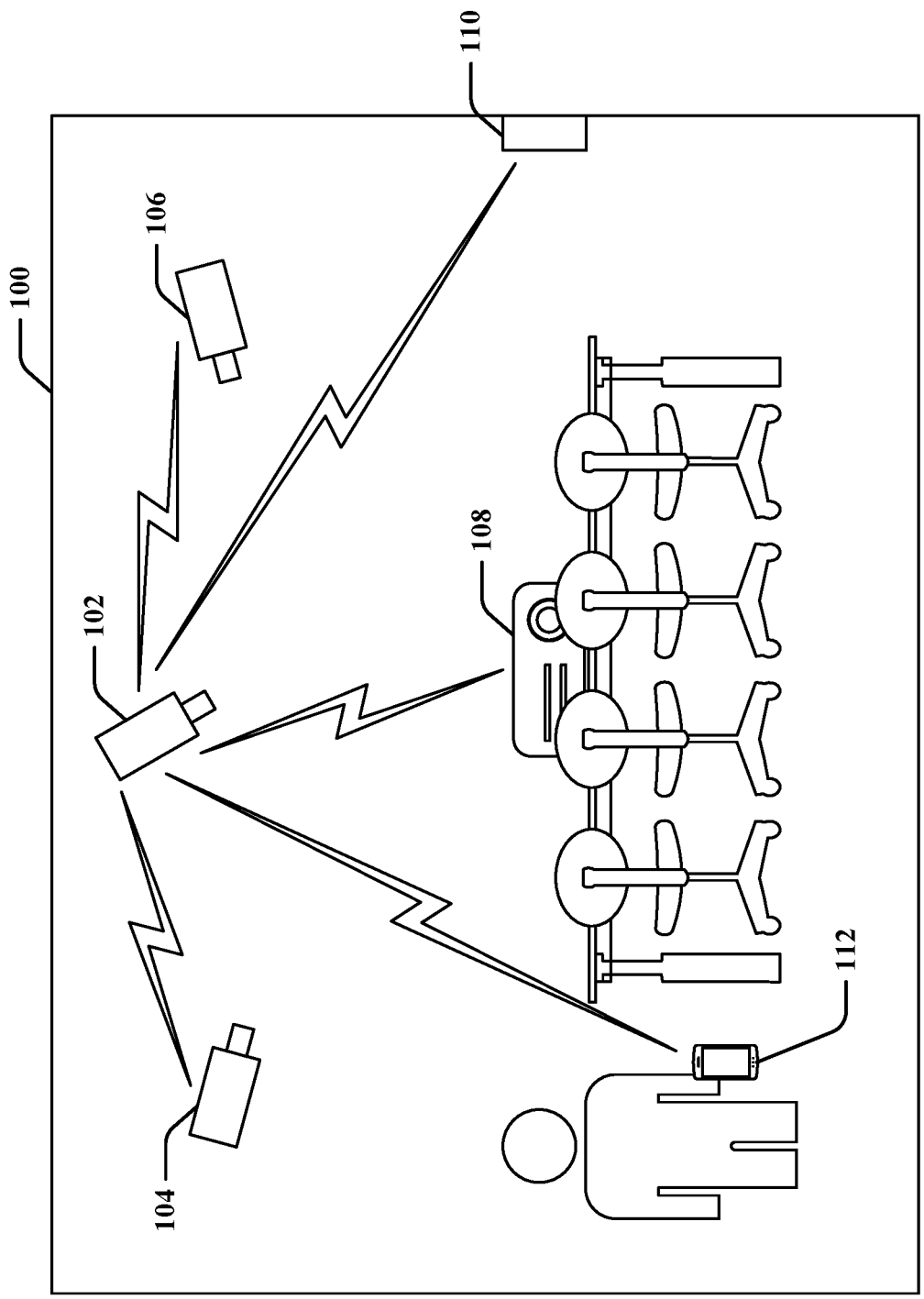
FIG. 1 illustrates an example of a room in a building having a gateway camera, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Cameras are often deployed in certain areas, such as areas within a building, for various purposes, such as video surveillance, subject identification/authentication, activity detections, etc. The cameras are often installed in a location that has a substantially clear line-of-sight to other cameras or devices within the area, such as on a ceiling of a room. In accordance with aspects described herein, wireless communications can be integrated within a gateway camera that is deployed in an area to allow the camera to be used as a gateway to an enterprise network. For example, the camera can communicate with an enterprise network via a backend connection, which can be a wired or wireless connection, and can include a wireless communication technology interface to allow other devices (e.g., other cameras, Internet-of-Things (IoT) devices, personal devices, computers, etc.) in the area to communicate with the gateway camera via the wireless communication technology interface to access the enterprise network.

In an example, the wireless communication technology can include fifth generation (5G) or other cellular technology, such that the camera can provide a 5G cell to which other devices can connect to access the enterprise network via the gateway camera. In another example, the wireless communication technology can include Institute of Electrical and Electronics Engineers (IEEE) 802.11 technologies (WiFi), Bluetooth, Bluetooth low energy (BLE), or substantially any wireless communication technology. In one example, the gateway camera may not terminate traffic from the other devices, and as such may forward the data from other devices to the enterprise network. In another example, the gateway camera may modify the data or use certain protocols, such as message queue telemetry transport (MQTT), and as such may store, modify, and then forward the data with other messages or using the specific protocol.

In accordance with examples described herein, deploying gateway cameras with wireless communication technology interfaces can provide various advantages over the current state of technology. For example, allowing other devices to connected to the gateway cameras can facilitate extending the enterprise network to devices that can connect to the gateway cameras, and allow for easy and reliable addition of devices to the network. In addition, allowing other cameras to communicate with gateway cameras using the wireless communication technology interface can decrease the need for cabling for the other cameras. As described, the location of the camera (e.g., being on a ceiling or other high spot in an area) can allow for good line-of-sight to the camera for devices communicating therewith to leverage the gateway functionality.

Turning now to the figures, example aspects are depicted with reference to one or more modules or components described herein, where modules or components in dashed lines may be optional.

Referring to FIG. 1, an example of a room 100 in a building having a gateway camera 102 is illustrated. The gateway camera 102 can be deployed in the room 100 at a location with good line-of-sight to other devices in the room 100 to allow the other devices to wirelessly communicate with the gateway camera 102. The other devices can include one or more other cameras 104, 106, enterprise devices 108 (e.g., a projector, computer, or other devices owned by an entity or enterprise, where the entity may be a corporation or other business, educational facility, etc.) associated with the room 100 or building, an IoT device 110, which may include a switch on the wall, a fire alarm, a microphone, a smart speaker, or substantially any IoT device, a personal device 112 of a user, such as a cellular phone. In an example, the IoT device 110 is shown as deployed on the wall, but may be anywhere within the room 100 or otherwise within line-of-sight of the gateway camera 102.

In accordance with aspects described herein, the gateway camera 102 can be communicatively coupled or otherwise connected with an enterprise network of the entity (e.g., via a wired or wireless connection to one or more components of the enterprise network, such as a network switch). For example, the gateway camera 102 may be attached to cabling that provides the wired connection to the enterprise network, or may be wirelessly attached to the enterprise network via wireless local area network (WLAN) or other technology. The gateway camera 102 can provide a wireless communication technology interface, such as 5G, WiFi, Bluetooth, BLE, etc., as described, which can be used to communicate with the gateway camera 102 to access the enterprise network. For example, the gateway camera 102 can provide a 5G cell, which other devices (e.g., cameras 104, 106, network devices, such as enterprise devices 108, IoT devices 110, personal devices 112, etc.) can discover or detect and to which the other devices can request connection establishment to communicate with the gateway camera 102.

In one example, the additional cameras 104, 106 may not have capability to directly connect to the enterprise network (e.g., may not have a port for a wired connection to the enterprise network). As such, for example, the additional cameras 104, 106 can be configured to search for the gateway camera 102 or a cell provided by the gateway camera 102 (e.g., a 5G cell) to which to connect for accessing the enterprise network. In any case, in accordance with aspects described herein, the gateway camera 102 can wirelessly connect to, and receive communications from, various other cameras or devices, and can forward the communications to the enterprise network over a separate connection to allow for effectively extending coverage of the enterprise network to other cameras or devices that can communicate with the gateway camera 102.

Figure 2:
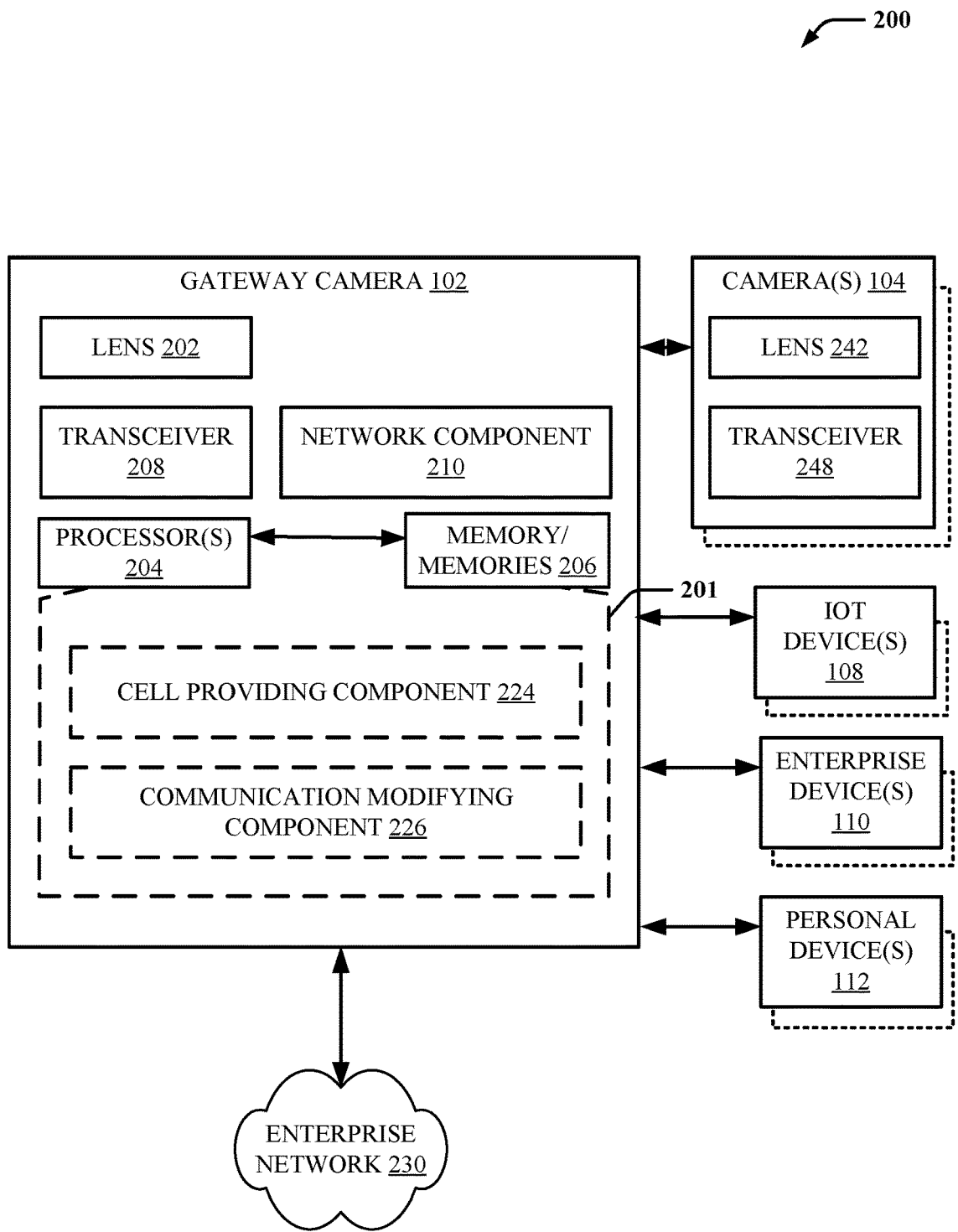
FIG. 2 is a schematic diagram of an example of a system including a gateway camera to facilitate connecting devices to an enterprise network, in accordance with aspects described herein.

FIG. 2 is a schematic diagram of an example of a system 200 including a gateway camera 102 to facilitate connecting devices to an enterprise network, in accordance with aspects described herein. In an example, system 200 can include a gateway camera 102. System 200 may also include one or more additional cameras 104, one or more enterprise devices 108, one or more IoT devices 110, one or more personal devices 112, etc. that can wirelessly connect to, and/or communicate with, the gateway camera 102 to access an enterprise network 230 in accordance with aspects described herein.

For example, each of the cameras 102, 104 can include red, green, blue (RGB) cameras, infrared cameras, or other cameras installed in a room of a building. In one example, the camera(s) 102, 104 can include security cameras. At least the gateway camera, in an example, can be installed at a location to provide desirable line-of-sight to the other cameras 104/devices 108, 110, 112, to provide reliable wireless connectivity thereto. For example, 5G can be directional (e.g., using beamformed signals), which can benefit from desirable line-of-sight between communicating devices.

In an example, gateway camera 102 can include or can otherwise be coupled with one or more processors 204 and/or a memory or memories 206, where the processor(s) 204 and/or memory/memories 206 can be configured to execute or store instructions or other parameters related to capturing video via an input module 202, such as a lens, and wirelessly communicating with the one or more other cameras 104 or devices 108, 110, 112, as described herein. For example, processor(s) 204 and memory/memories 206 may be separate components communicatively coupled by a bus (e.g., on a motherboard or other portion of a computing device, on an integrated circuit, such as a system on a chip (SoC), etc.), components integrated within one another (e.g., processor(s) 204 can include the memory/memories 206 as an on-board component 201), and/or the like. Memory/memories 206 may store instructions, parameters, data structures, etc., for use/execution by processor(s) 204 to perform functions described herein.

For example, gateway camera 102 can also include a transceiver 208 for facilitating wireless communications with the one or more other cameras 104 or devices 108, 110, 112, and/or a network component 210 for communicating with the enterprise network 230 over a backend wired or wireless connection. For example, the transceiver 208 can be a 5G transceiver, WiFi transceiver, Bluetooth or BLE transceiver, etc., and can accordingly include various radio frequency (RF) components, such as a receiver, transmitter, one or more processors, power amplifiers, oscillators, etc., to facilitate receiving signals from the one or more other cameras 104 or devices 108, 110, 112, transmitting signals to the one or more other cameras 104 or devices 108, 110, 112, broadcasting signals to advertise wireless communication functionality (e.g., to provide a 5G cell, a corresponding slice, etc.), and/or the like. Network component 210 can include a network port (e.g., Ethernet port) for a wired connection to the enterprise network 230, a WLAN connection for wireless connection to the enterprise network 230, and/or the like. In accordance with aspects described herein, transceiver 208 can facilitate wireless communications to provide gateway functionality to the enterprise network 230 effectively extending coverage of the enterprise network 230. In one example, the transceiver 208 can include, or be provided in, a dongle that couples to a port on the gateway camera 102 (e.g., a universal serial bus (USB) port), such as a 5G or WiFi dongle. In one example, network component 210 can provide a network switch to enterprise network 230. Moreover, in accordance with some aspects described herein, the gateway camera 102 can provide a MQTT or WiFi hub.

In an example, gateway camera 102 can optionally include one or more of cell providing component 224 for providing a 5G cell (or other wireless communication technology cell), and/or a communication modifying component 226 for modifying communications received from one or more other cameras 104 or devices 108, 110, 112 before sending corresponding communications over enterprise network 230. For example, cell providing component 224 can transmit, via transceiver 208, signals to advertise existence of the 5G cell provided by the gateway camera 102, such as broadcast signals on one or more frequencies defined in 5G, which the one or more other cameras 104 or devices 108, 110, 112 can detect and accordingly initiate connection with the gateway camera 102 using the wireless communication technology. In some examples, gateway camera 102 can forward communications from other devices, without modification, to the enterprise network 230 using network component 210. In other examples, communication modifying component 226 can terminate the communications from the other devices, and modify the communications before forwarding to the enterprise network 230, such as by adding messages with the communications, reformatting the communications according to a certain protocol, and/or the like.

In an example, camera(s) 104 can include similar components as the gateway camera 102, or less components to provide more simplified functionality of connecting with the gateway camera 102 for accessing the enterprise network 230. For example, camera(s) 104 can include an input module 242, such as a lens, for capturing video and a transceiver 248 for establishing a wireless connection with the gateway camera 102 and transmitting the captured video to the gateway camera 102 for providing to the enterprise network 230. In one example, the enterprise network 230 can be or can connect to a cloud-based computing architecture for storing data (e.g., video from other cameras 104) on cloud-based computing resources (e.g., distributed disk or memory storage). In one example, the gateway camera 102 and/or camera(s) 104 can include the same or similar components, and can auto configure to be a gateway camera that provides a 5G base station or a node that connects to the gateway camera depending on network connection.

Figure 3:
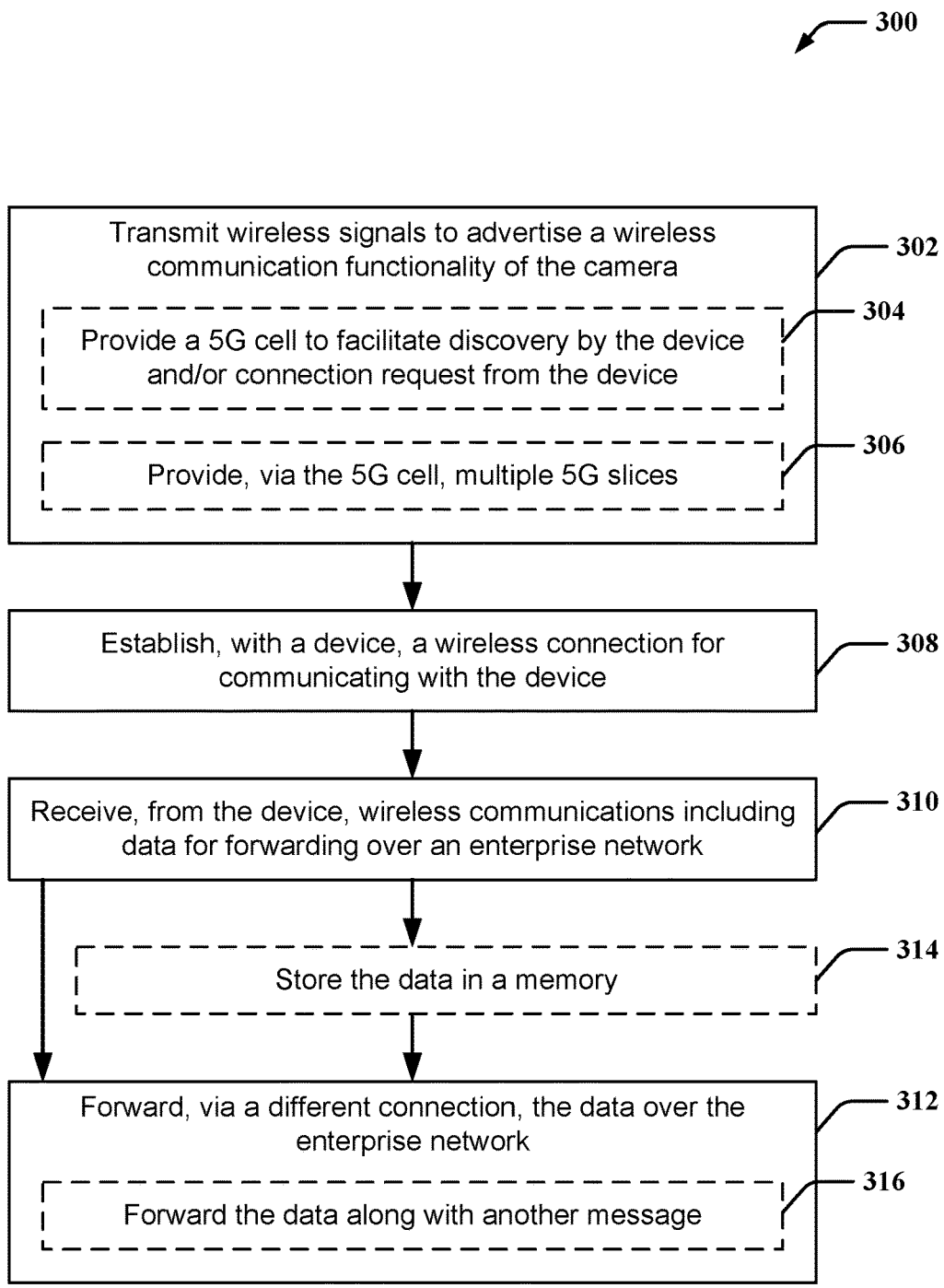
FIG. 3 is a flowchart of an example of a method for providing enterprise network gateway functionality in a camera, in accordance with aspects described herein.

Referring to FIG. 3, an example of a method 300 for providing enterprise network gateway functionality in a camera is depicted. The operations of the method 300 may be performed by one or more modules or components of the gateway camera 102, as described herein.

At 302, the method 300 may include transmitting wireless signals to advertise a wireless communication functionality of the camera. In an example, transceiver 208, e.g., in conjunction with the one or more processors 204, memory/memories 206, etc., can transmit the wireless signals to advertise the wireless communication functionality of the camera. For example, transceiver 208 can transmit the wireless signals over frequencies defined in the wireless communication technology implemented in the transceiver 208 to advertise the wireless communication functionality.

In one example, in transmitting the wireless signals at 302, optionally at 304, a 5G cell can be provided to facilitate discovery by the device and/or connection request from the device. In an example, cell providing component 224, e.g., in conjunction with the one or more processors 204, memory/memories 206, transceiver 208, etc., can provide the 5G cell to facilitate discovery by the device and/or connection request from the device. For example, cell providing component 224 can broadcast certain signals defined in 5G, over certain frequency and/or time resources defined in 5G, for advertising a 5G cell or other ability to connect with devices using 5G.

In another example, in transmitting the wireless signals at 302, optionally at 306, multiple 5G slices can be provided via the 5G cell. In an example, cell providing component 224, e.g., in conjunction with the one or more processors 204, memory/memories 206, transceiver 208, etc., can provide, via the 5G cell, multiple 5G slices. For example, 5G can support network slicing to provide various virtual networks in the 5G cell (e.g., using the same physical hardware or interface). For example, cell providing component 224 can define the various slices (e.g., virtual networks) and can facilitate routing wireless communications among the slices. For example, each slice can have different supported quality-of-service (QoS) or reliability, security mechanisms or protocols (e.g., authentication/authorization, encryption, etc.), or other features. For example, a first slice can be optimized for latency, a second slice can be optimized for bandwidth, a third slice can be optimized for power devices, etc., In any case, cell providing component 224 can provide the features to connected camera(s) 104 or device(s) 108, 110, 112, via (or based on) the slice to which the camera(s) 104 or device(s) 108, 110, 112 connect. In one specific example, cell providing component 224 can provide (and/or advertise) different private or public network 5G slices, such as different slices for cameras, enterprise network components (e.g., devices owned by a company that owns the enterprise network 230), personal devices (e.g., phones, tablets, computers, or other devices owned by persons), etc.

At 308, the method 300 can include establishing, with a device, a wireless connection for communicating with the device. In an example, transceiver 208, e.g., in conjunction with the one or more processors 204, memory/memories 206, etc., can establish, with the device (e.g., camera(s) 104, device(s) 108, 110, 112, etc.), the wireless connection for communicating with the device. In one example, the device can request establishment of the connection with the gateway camera 102 based on the wireless connectivity advertised by the gateway camera 102. In one example, the device can request establishing of the connection using 5G-specific mechanisms, which may include transmitting a request to establish the connection to the gateway camera 102. In this example, transceiver 208 can receive the request and can transmit a response indicating resources over which the device can wirelessly communicate with (e.g., receiving signals from or transmit signals to) the gateway camera 102.

In one example, where the gateway camera 102 supports 5G slices, cell providing component 224 can configure slice-specific parameters for the device based on a type of the device or based on certain parameters received during or after connection establishment with the device. For example, cell providing component 224 can identify a slice for the device (e.g., as requested or based on parameters of the device) and can configure resources based on the slice, where the slices can correspond to different time or frequency resources (e.g., different portions and/or sizes of frequency spectrum). In another example, cell providing component 224 can configure, for the device, security protocols associated with the slice, etc. during connection establishment. In any case, the device can establish connection with the gateway camera 102 for accessing the enterprise network 230, and/or may indicate a desire or otherwise request enterprise network 230 access from the gateway camera 102.

At 310, the method 300 can include receiving, from the device, wireless communications including data for forwarding over an enterprise network. In an example, transceiver 208, e.g., in conjunction with the one or more processors 204, memory/memories 206, etc., can receive, from the device (e.g., camera(s) 104, device(s) 108, 110, 112, etc.), wireless communications including data for forwarding over the enterprise network. For example, after establishing the wireless connection with the gateway camera 102, the device can transmit wireless signals thereto including data for forwarding to the enterprise network 230 (e.g., for forwarding to one or more devices identified on the enterprise network 230). For example, the data may include an address of a node on the enterprise network 230 to receive the data.

At 312, the method can include forwarding data, via a different connection, over the enterprise network. In an example, network component 210, e.g., in conjunction with the one or more processors 204, memory/memories 206, etc., can forward, via the different connection (e.g., a wired or wireless connection with the enterprise network 230), the data over the enterprise network. In an example, network component 210 can forward the data without terminating the data. In other examples, the gateway camera 102 can terminate the data and modify the data before forwarding.

At 314, the method 300 can optionally include storing the data in a memory, and at 316, forwarding the data can include forwarding the data along with another message. In an example, network component 210, e.g., in conjunction with the one or more processors 204, memory/memories 206, etc., can store the data in memory/memories 206, terminating the data at the gateway camera 102, and can forward the data along with another message or otherwise modify the data. For example, network component 210 can add messages or parameters to the data, format the data to a certain protocol (e.g., MQTT), and/or the like before forwarding the data over the enterprise network 230. In any case, gateway camera 102 can provide gateway functionality in this regard to forward (or store and forward) data received over a wireless connection from various other cameras or devices to the enterprise network 230 via a different connection.

In an example, for IoT devices 110, wireless communications may include metadata or other status information, etc. that may be accumulated by the transceiver (e.g., in memory/memories 206), and may be periodically forwarded over the enterprise network 230 via network component 210 in a batch of multiple messages, formatted using an IoT-specific protocol, MQTT, etc.

Figure 4:
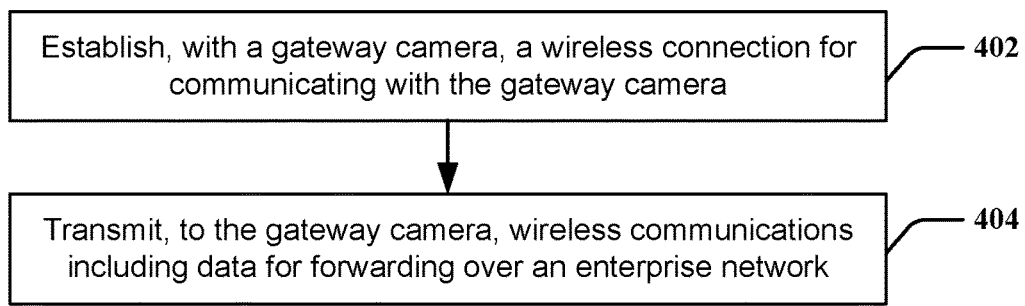
FIG. 4 is a flowchart of an example of a method for receiving enterprise network gateway functionality from a gateway camera, in accordance with aspects described herein.

Referring to FIG. 4, an example of a method 400 for receiving enterprise network gateway functionality from a gateway camera is depicted. The operations of the method 300 may be performed by one or more modules or components of a camera 104, as described herein, or other device(s) 108, 110, 112.

At 402, the method 400 may include establishing, with a gateway camera, a wireless connection for communicating with the gateway camera. In an example, transceiver 248, e.g., in conjunction with the one or more processors, memory/memories, etc. of the camera 104, can establish, with the gateway camera (e.g., gateway camera 102), the wireless connection for communicating with the gateway camera. For example, this can be based on gateway camera 102 advertising support for the wireless connection using one or more wireless communication technologies. For example, transceiver 248 can monitor for and/or detect wireless signals from the gateway camera 102 over certain frequency or time resources defined by the wireless communication technology for advertising support for the wireless communication technology (e.g., 5G, WiFi, Bluetooth, BLE, etc.). In this example, transceiver 248 can receive the wireless signals and can accordingly establish the wireless connection using procedures defined in the wireless communication technology (e.g., sending certain signals, such as a request to establish the connection, over certain frequency or time resources, etc.). In an example, the gateway camera 102 can respond with an acceptance of the request from the camera 104 to establish the wireless connection.

At 404, the method 400 may include transmitting, to the gateway camera, wireless communications including data for forwarding over an enterprise network. In an example, transceiver 248, e.g., in conjunction with the one or more processors, memory/memories, etc. of the camera 104, can transmit, to the gateway camera (e.g., gateway camera 102), the wireless communications including data for forwarding over the enterprise network (e.g., enterprise network 230). In an example, the data can identify a node on the enterprise network 230 to receive the data (e.g., a destination address), and the gateway camera 102 can forward the data for routing to the node. In an example, where a camera 104 is transmitting the wireless communications, the data may include video captured via lens 242 of the camera 104. In this example, or for other types of devices, the data can include substantially any type of data for forwarding to enterprise network 230.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X. Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

What is claimed is:

1. A camera for providing video within a building, comprising:
    a memory for storing wireless communications received from a device, wherein the device is an Internet-of-Things (IoT) device;
    an input module, including a lens, for capturing video;
    a communications module for sending the captured video, captured by the input module via the lens, over an enterprise network; and
    a transceiver for communicating with the device, the transceiver configured for:
        establishing a wireless connection with the device using a wireless communication technology; and
        receiving the wireless communications from the device via the wireless connection and storing the wireless communications in the memory,
    wherein the communications module forwards, over the enterprise network and using a message queue telemetry transport (MQTT) protocol, the wireless communications from the device, as stored in the memory, along with another message.

2. The camera of claim 1, wherein the wireless communication technology is fifth generation (5G) cellular technology.

3. The camera of claim 2, wherein the transceiver provides a 5G cell to facilitate discovery by the device and connection request from the device.

4. The camera of claim 3, wherein the transceiver provides, via the 5G cell, multiple 5G slices, including a first slice for communicating with the device, and a second slice for communicating with personal devices that connect to the 5G cell.

5. The camera of claim 4, wherein each of the multiple 5G slices provides a separate security profile for securing wireless communications for associated devices.

6. The camera of claim 1, wherein the wireless communication technology is WiFi.

7. The camera of claim 1, wherein the device is a second camera, and wherein the wireless communications include video packets of video captured via the second camera.

8. A method for providing a wireless communications gateway at a camera, comprising:
    capturing video via a lens of the camera;

sending, by the camera, the captured video over an enterprise network;

transmitting, by the camera, wireless signals to advertise a wireless communication functionality of the camera;

establishing, by the camera and with a device, a wireless connection for communicating with the device, wherein the device is an Internet-of-Things (IoT) device;

receiving, by the camera and from the device, wireless communications including data for forwarding over the enterprise network;

storing the data in a memory of the camera; and forwarding, by the camera and via a different connection over the enterprise network and using a message queue telemetry transport (MQTT) protocol, the data, as stored in the memory, along with another message.

9. The method of claim 8, wherein the wireless communication functionality corresponds to fifth generation (5G) cellular technology.

10. The method of claim 9, wherein advertising the wireless communication functionality includes providing a 5G cell to facilitate discovery by the device and connection request from the device.

11. The method of claim 10, further comprising providing, via the 5G cell, multiple 5G slices, including a first slice for communicating with the device, and a second slice for communicating with personal devices that connect to the 5G cell.

12. The method of claim 11, wherein each of the multiple 5G slices provides a separate security profile for securing wireless communications for associated devices.

13. The method of claim 8, wherein the wireless communication functionality corresponds to WiFi.

14. The method of claim 8, wherein the device is a second camera, and wherein the wireless communications include video packets of video captured via the second camera.

15. A camera for providing video within a building, comprising:

an input module for capturing video; and a transceiver for communicating with a second camera over a wireless connection, wherein the second camera is configured for sending separate video captured by the second camera over an enterprise network, wherein the second camera is further configured for forwarding, via a different connection over the enterprise network and using a message queue telemetry transport (MQTT) protocol, data from wireless communications from the camera along with another message, the transceiver configured for:

establishing a wireless connection with the second camera using a wireless communication technology; and transmitting the video in wireless communications to the second camera via the wireless connection for forwarding over the enterprise network.

16. The camera of claim 15, wherein the transceiver is configured for discovering a fifth generation (5G) cell provided by the second camera, and wherein establishing the wireless connection with the second camera includes transmitting a connection request to the second camera in the 5G cell.

* * * * *